US012352732B1

(12) United States Patent
Whiting et al.

(10) Patent No.: US 12,352,732 B1
(45) Date of Patent: Jul. 8, 2025

(54) MONOLITHIC MULTI-DIMENSIONAL CHROMATOGRAPHY

(71) Applicant: National Technology & Engineering Solutions of Sandia, LLC, Albuquerque, NM (US)

(72) Inventors: Joshua J. Whiting, Albuquerque, NM (US); Matthew W. Moorman, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 423 days.

(21) Appl. No.: 17/845,104

(22) Filed: Jun. 21, 2022

(51) Int. Cl.
*G01N 30/30* (2006.01)
*G01N 30/46* (2006.01)
*G01N 30/60* (2006.01)
*G01N 30/02* (2006.01)

(52) U.S. Cl.
CPC .......... *G01N 30/30* (2013.01); *G01N 30/466* (2013.01); *G01N 30/606* (2013.01); *G01N 2030/025* (2013.01)

(58) Field of Classification Search
CPC .... G01N 30/30; G01N 30/466; G01N 30/606; G01N 2030/025
See application file for complete search history.

(56) References Cited

U.S. PATENT DOCUMENTS

| | | | | |
|---|---|---|---|---|
| 9,751,040 B2 * | 9/2017 | Tipler | ..................... | G01N 30/72 |
| 10,151,732 B1 * | 12/2018 | Moorman | ............ | G01N 30/606 |
| 10,768,150 B2 * | 9/2020 | Fan | ..................... | G01N 30/463 |
| 11,243,192 B2 * | 2/2022 | Steen | ..................... | G01N 30/30 |
| 2001/0001460 A1 * | 5/2001 | Moon | ................ | G01N 30/6095 |
| | | | | 216/37 |
| 2011/0259081 A1 * | 10/2011 | Chou | ................... | G01N 30/465 |
| | | | | 73/23.42 |

OTHER PUBLICATIONS

The microfluidic Deans switch: 50 years of progress, innovation and application Khan M. Sharif et al. Trends in Analytical Chemistry 82 (2016) 35-54 (Year: 2016).*
Manginell, et al., "A Monolithically-Integrated µGC Chemical Sensor System", In Sensors, 2011, vol. 11, pp. 6517-6532.
Whiting, et al., "A High-Speed, High-Performance, Microfabricated Comprehensive Two-Dimensional Gas Chromatograph", The Royal Society of Chemistry, In Lab Chip, vol. 19, 2019, pp. 1633-1643.

* cited by examiner

*Primary Examiner* — John E Breene
*Assistant Examiner* — Alex T Devito
(74) *Attorney, Agent, or Firm* — Calfee, Halter & Griswold LLP; Samantha Updegraff

(57) ABSTRACT

A monolithically integrated chromatography device includes a first chromatography column and a second chromatography column formed in a common substrate. The first chromatography column and the second chromatography column are each in fluidic communication with a port formed on the same common substrate. When the port is open, the first chromatography column and the second chromatography column are in fluidic communication with one another. When the port is closed, the first chromatography column and the second chromatography column are not in fluidic communication with one another. The monolithically integrated chromatography device can include a heating element formed on the same substrate as the chromatography columns.

20 Claims, 8 Drawing Sheets

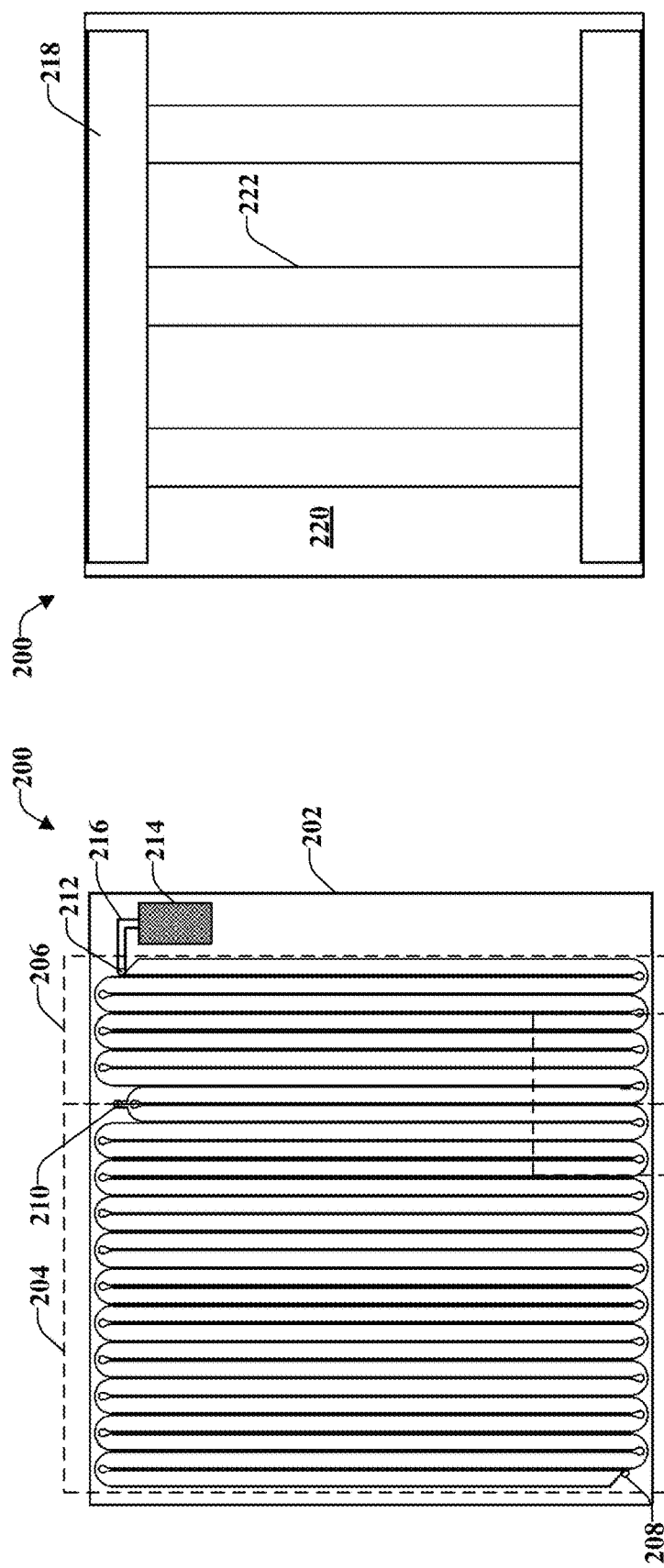
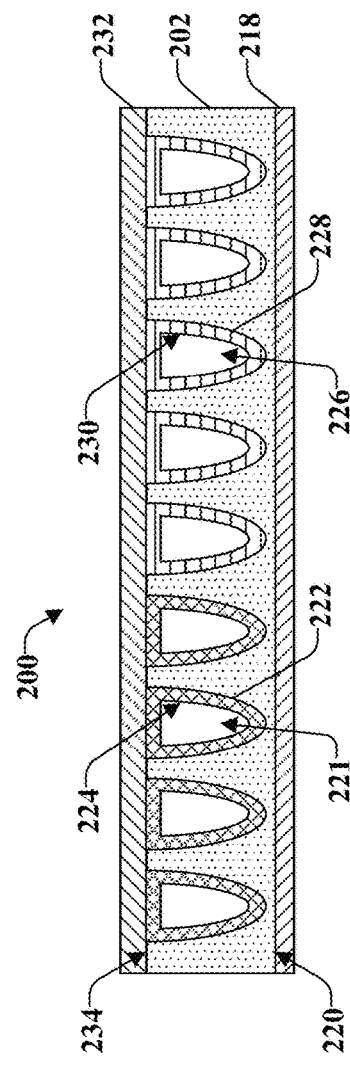
FIG. 2B
FIG. 2C
FIG. 2A

MONOLITHIC MULTI-DIMENSIONAL CHROMATOGRAPHY

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Chromatography is a technique used to separate different chemical species present in a fluid mixture, whether gas or liquid. Conventionally, a fluid analyte is passed through a chromatography column. The chromatography column includes a stationary phase of a substance that interacts differently with different species flowing through the column. Due to the differential interaction of the species with the stationary phase, the different species in the fluid analyte exhibit different apparent velocities through the column, and therefore are physically separated at an output of the column.

Apparatus have been developed for two-dimensional chromatography. To perform two-dimensional chromatography, a fluid analyte is introduced to a first chromatography column that tends to separate chemical species in the analyte according to a first property of the species. The separated species of the analyte are subsequently introduced to a second chromatography column that tends to separate the chemical species according to a second property of the species. At an output of the second chromatography column, the further-separated analyte is received by a detector. A retention time of different species in each of the two chromatography columns can be determined based upon output of the detector and a known flow modulation of the fluid analyte from the first chromatography column to the second chromatography column.

Apparatus for two-dimensional chromatography generally employ pipes, conduits, or tubing to move a fluid analyte from a first chromatography column to a second chromatography column and then from the second chromatography column to a detector. However, such pipes, conduits, and tubing present "dead" volumes to the fluid analyte in which chromatographic separation of the analyte does not occur. These dead volumes can degrade the performance of a system for two-dimensional chromatography. Furthermore, if these pipes, conduits, or tubing are not maintained at an appropriate temperature, condensation of analyte and carrier gases can occur. This condensation can also degrade the performance of a two-dimensional chromatography system. However, maintaining such pipes, conduits, or tubing at a target temperature in a two-dimensional chromatography system can be difficult.

SUMMARY

The following is a brief summary of subject matter that is described in greater detail herein. This summary is not intended to be limiting as to the scope of the claims.

Various technologies for multi-dimensional chromatography using a monolithically integrated chromatography column stack are described herein. In an exemplary embodiment, a chromatography system includes a first chromatography column and a second chromatography column, wherein the first chromatography column and the second chromatography column are formed in a same substrate. The system further includes a port that is formed in the same substrate as the first chromatography column and the second chromatography column. The system also includes a flow control element that is coupled to the port. In various embodiments, the flow control element can be a valve that is modulated by positive pressure such that when the valve is in an open position the port is closed, and vice versa. In other embodiments, the valve can be modulated by negative pressure such that when the valve is in an open position, the port is open, and when the valve is in a closed position, the port is closed. Unless otherwise clear from context, embodiments described herein assume that valves are modulated by positive pressure, however, it is to be understood that the various embodiments described herein can be modified to include valves that are modulated by negative pressure.

The flow control element can selectively open and close the port to regulate flow of a fluid analyte from the first chromatography column to the second chromatography column. In exemplary embodiments wherein the flow control element is a valve modulated by positive pressure, when the valve is in a closed position, such that the port is open, the first chromatography column and the second chromatography column are in fluidic communication by way of the port. When the valve is in an open position, such that the port is closed, the first chromatography column and the second chromatography column are not in fluidic communication. Thus, a fluid analyte sample can be introduced into the first chromatography column, whereupon the fluid analyte is separated. The separated fluid analyte can then be selectively introduced to the second chromatography column by controlled operation of the flow control element. The second chromatography column further separates the fluid analyte. A detector can receive the further-separated fluid analyte from the second chromatography column. The detector outputs a signal or data that is indicative of separation of chemical species in the fluid analyte.

The first chromatography column, the second chromatography column, and the port are monolithically integrated in a same substrate. Thus, the port can be made very small relative to pipes and tubing used to convey analyte samples from one chromatography column to another in a conventional two-dimensional chromatography system. Accordingly, when the port of the monolithically integrated chromatography system is opened (e.g., by controlling the flow control element), an analyte sample flowing from the first chromatography column to the second chromatography column is subjected to less "dead" volume than in a conventional two-dimensional chromatography system.

In various embodiments of chromatography systems described herein, the first chromatography column and the second chromatography column are included in an array of chromatography columns that are selectively addressable by way of a system of controllable flow control elements. In a non-limiting example, a chromatography system includes an array of chromatography columns, an inlet channel, and an outlet channel, each formed in a same substrate. Each of the chromatography columns includes a respective inlet and outlet. The inlets of the chromatography columns can be connected to the inlet channel by way of respective inlet transfer ports. The outlets of the chromatography columns can be connected to the outlet channel by way of respective outlet transfer ports. The inlet channel and the outlet channel can be in fluidic communication by way of a transfer channel that can include a transfer port. The transfer port, the inlet transfer ports, and the outlet transfer ports can be selectively opened and closed by way of respective flow control elements. When the transfer port is open, the inlet channel and the outlet channel are in fluidic communication by way of the transfer channel. When the transfer port is closed, the inlet channel and the outlet channel are not in fluidic communication. By selective control of the flow control elements coupled to the transfer port and the inlet/outlet transfer ports of the array of chromatography columns, an analyte sample can be directed through two or more of the chromatography columns in a desired order, to facilitate N-dimensional separation of the analyte sample.

Exemplary chromatography systems described herein can further include a heating element that is positioned on the same substrate as the plurality of chromatography columns. By way of example, and not limitation, the first chromatography column and the second chromatography column can be formed as trenches in a front side of a substrate, and the heating element can be formed on a back side of the substrate, the back side opposite the front side. The heating element can be, for example, a metallization layer that forms an electrically conductive trace. An electric current can be caused to flow through the trace, causing the trace to heat up due to Ohmic heating. The heating element can be controlled to maintain a desired heat profile throughout a system of chromatography columns. Further, the heating element can prevent cold spots in a port between two chromatography columns, an inlet channel, and/or an outlet channel used to connect an array of chromatography columns, thereby preventing condensation of an analyte sample that could otherwise degrade performance of the chromatography system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 2A-2C illustrate various views of an exemplary chromatography system. FIG. 2A is a top-down view of the exemplary chromatography system. FIG. 2B is a bottom-up view of the exemplary chromatography system. FIG. 2C is a partial cross-sectional view of the exemplary chromatography system looking along line A-A' shown in FIG. 2A.

DETAILED DESCRIPTION

Figure 1:
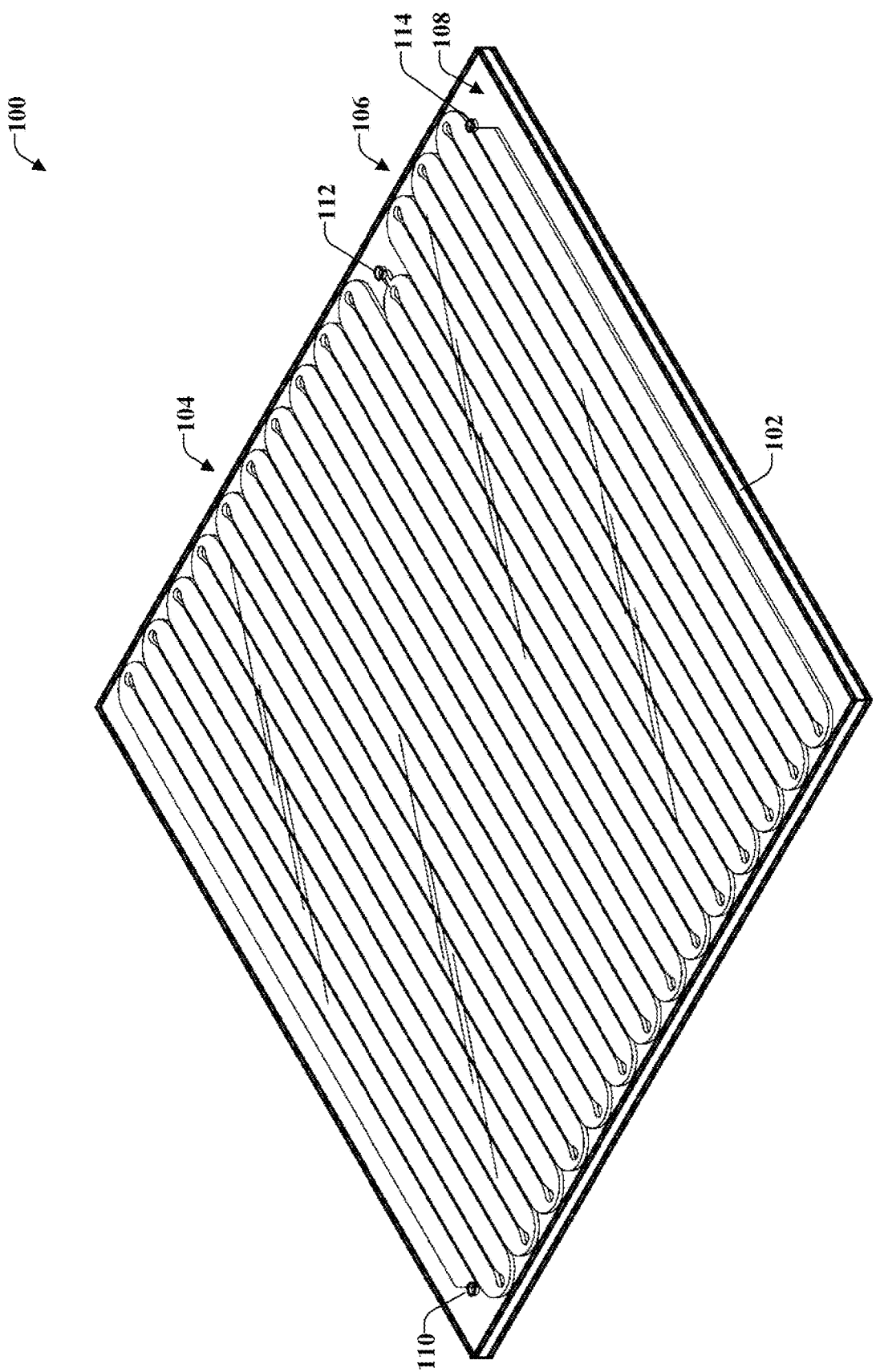
FIG. 1 is a perspective view of an exemplary monolithic chromatography column stack.

Various technologies pertaining to a system for multi-dimensional chromatography are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary chromatography column stack 100 is illustrated. The chromatography column stack 100 is formed on a substrate 102. The chromatography column stack 100 comprises a first chromatography column 104 and a second chromatography column 106. The chromatography columns 104, 106 comprise respective channels formed in the substrate 102 such that the substrate 102 itself forms sidewalls of the chromatography columns 104, 106. The chromatography columns 104, 106 illustrated in FIG. 1 have a switch-back, or snaking, geometry. However, it is to be understood that the channels of the chromatography columns 104, 106 can have substantially any geometry (e.g., a spiral geometry).

The substrate 102 can be composed of any of various materials. In non-limiting examples, the substrate 102 can be formed of a material that can be processed according to various semiconductor processing techniques such as etching (e.g., reactive ion etching), ablation, or the like. By way of further example, the substrate 102 can comprise silicon, silica, or any of various ceramics.

The chromatography column stack 100 can further include a cap 108 that forms a top sidewall of the chromatography columns 104, 106 such that the chromatography columns 104, 106 comprise sealed channels. The cap 108 can be bonded, adhered, or otherwise affixed to the substrate 102. In non-limiting examples, the cap 108 can be anodically bonded or eutectically bonded to the substrate 102. In another example, the cap 108 can be glued to the substrate 102. The cap 108 can be formed from any of various materials including, but not limited to, glass, silicon, or various ceramics.

The chromatography column stack 100 further includes an inlet port 110, a transfer port 112, and an outlet port 114. The inlet port 110 comprises an opening in the cap 108 that allows a fluid analyte sample to be introduced into the first chromatography column 104. As the sample traverses the first chromatography column 104, the sample interacts with a first stationary phase disposed on the sidewalls of the first chromatography column 104. Different chemical species in the sample can be absorbed and desorbed by the first stationary phase at different rates, thereby causing physical separation of such species along the length of the first chromatography column 104.

The first chromatography column 104 terminates at the transfer port 112. The second chromatography column 106 is configured to receive a fluid analyte sample from the transfer port 112. When the transfer port 112 is open, the second chromatography column 106 is in fluidic communication with the first chromatography column 104 and receives a separated fluid analyte sample from the first chromatography column 104. When the transfer port 112 is closed, the first chromatography column 104 and the second chromatography column 106 are not in fluidic communication with one another. The transfer port 112 can be opened and closed by operation of a valve coupled to the transfer port 112. In various embodiments, the transfer port 112 can have a micro-electromechanical system (MEMS) valve integrated therein. In such embodiments, the transfer port 112 may not extend through the cap 108, and the MEMs valve can be actuated by means of an electrical control signal. In other embodiments, the transfer port 112 can extend through the cap 108 of the column stack 100. In these embodiments, the transfer port 112 can be opened or closed by way of an external valve (not shown) that is coupled to the transfer port 112. It is to be understood that while reference is made to valves in the description of various embodiments set forth herein, a valve can instead be replaced with other flow control elements in any of the described embodiments while remaining consistent with the present disclosure. For example, while the transfer port 112 is described as having a valve coupled thereto, the transfer port 112 can instead include, be included in, or be controlled by an alternative flow element such as a Deans switch.

When the transfer port 112 is opened (e.g., by closing of a valve coupled to or integrated in the transfer port 112), a separated fluid analyte sample passes from the first chromatography column 104 to the second chromatography column 106. As the separated fluid analyte sample flows through the second chromatography column 106, the separated fluid analyte sample interacts with a second stationary phase present on sidewalls of the second chromatography column 106. The second stationary phase can have a different chemical composition than the first stationary phase, such that the second stationary phase is configured to interact with chemical species in an analyte sample differently than the first stationary phase. Accordingly, a fluid analyte sample flowing in the second chromatography column 106, which sample is separated by interaction with the first stationary phase in the first chromatography column 104, is further separated by interaction of chemical species in the fluid analyte with the second stationary phase in the second chromatography column 106.

A further-separated fluid analyte sample traverses the second chromatography column 106 to the outlet port 114. In exemplary embodiments, the outlet port 114 extends through the cap 108 and can be coupled to an external detector (not shown) that receives the further-separated fluid analyte sample. In other embodiments, and as will be described in greater detail below, the outlet port 114 can be coupled to a detector that is included on the same substrate 102 as the first chromatography column 104 and the second chromatography column 106. In any of these embodiments, the detector can be configured to generate a signal that is indicative of the presence of a chemical species on the detector. Based upon the signal and a known timing of introduction of a fluid analyte sample to each of the first chromatography column 104 and the second chromatography column 106, a traversal time of different chemical species through the columns 104, 106 can be determined. Based upon these traversal times, unknown chemical species in the analyte sample can be identified.

The chromatography column stack 100 facilitates two-dimensional chromatography with small dead volumes. The transfer port 112 is integrated into the same substrate 102 as the chromatography columns 104, 106, and is small relative to the length and volume of the chromatography columns 104, 106. A chromatography system employing the chromatography column stack 100 can exhibit improved performance over a conventional chromatography system that relies on pipes, tubing, or conduits to direct fluids from one chromatography column to another, which conventional system may be prone to condensation of an analyte sample in such pipes, tubing, or conduits.

Referring now to FIGS. 2A-2C, another exemplary chromatography device 200 is shown. FIG. 2A is a top-down view of the exemplary chromatography device 200. FIG. 2B is a bottom-up view of the exemplary chromatography device 200. FIG. 2C is a partial cross-sectional view of the exemplary chromatography device 200, cut along line A-A' shown in FIG. 2A. Referring now once again to FIG. 2A, the chromatography device 200 comprises a substrate 202 having a first chromatography column 204 and a second chromatography column 206 formed therein. The first chromatography column 204 includes an inlet 208 that is configured to receive an analyte sample. The first chromatography column 204 terminates in a transfer port 210 that serves as an inlet to the second chromatography column 206. The transfer port 210 can be selectively opened or closed by way of a flow control element coupled to the transfer port 210, which flow control element can be a MEMS valve or a Deans switch integrated with the transfer port 210. The second chromatography column 206 further comprises an outlet port 212 by way of which a separated analyte sample exits the second chromatography column 206.

The chromatography device 200 further includes a detector 214. The detector 214 is integrated on the same substrate 202 as the chromatography columns 204, 206. The detector 214 is in fluidic communication with the second chromatography column 206 by way of an outlet channel 216 that is coupled to the outlet port 212. In some embodiments, the outlet port 212 can be selectively opened and closed by way of a flow control element (e.g., an integrated MEMs valve, an external valve, a Deans switch, etc.) coupled to the outlet port 212. The detector 214 is configured to receive a separated analyte sample from the outlet port 212 over a period of time. Responsive to receipt of the separated analyte sample, the detector 214 outputs an electrical signal that is indicative of the presence of the separated analyte sample. In a non-limiting example, the detector 214 can be a magnetically-activated pivot plate resonator (PPR) that outputs an electrical signal indicative of a mechanical oscillating frequency of a pivot plate. As the separated analyte sample exits the second chromatography column 206 and is deposited on the detector 214, the added mass of the analyte sample changes the oscillating frequency of the pivot plate.

The change in the oscillating frequency can be determined from the electrical signal output by the detector 214. Over time, therefore, the electrical signal output by the detector 214 is indicative of a separation of mass of the analyte sample by the chromatography columns 204, 206, which can be used as a signature to identify the presence of different chemical species in the analyte sample.

Referring now solely to FIG. 2B, the chromatography device 200 can include a heating element 218 that is disposed on a backside 220 of the substrate 202. The heating element 218 can comprise a metallization layer that forms a conductive trace (e.g., conductive trace 222). The heating element 218 can be connected to an electrical power source that is configured to cause a current to flow through the heating element 218, thereby heating the heating element 218 through Ohmic heating. The current in the heating element 218 can be controlled to modulate the temperature of the chromatography device 200. A geometry of the heating element 218 can be configured to establish a temperature gradient across the chromatography device 200. For example, the heating element 218 can be configured to have a geometry that exhibits a higher electrical resistance at a first end of the device 200 than at a second end of the device 200. When an electrical current flows through the heating element 218, the higher resistance of the element 218 at the first end of the device 200 can cause a temperature at the first end of the device 200 to be greater than at the second end.

Heating of the chromatography device 200 by the heating element 218 can facilitate separation of an analyte sample in the chromatography columns 204, 206. Furthermore, heating of the chromatography device 200 by the heating element 218 can prevent cold spots in the device 200 that otherwise could cause condensation of the analyte sample. In conventional two-dimensional chromatography devices, the pipes, tubes, and conduits used to convey an analyte sample from one chromatography column to the next are difficult to heat reliably, and are prone to the development of cold spots that cause analyte condensation. Thus, the chromatography device 200 can yield greater performance of a chromatography system by prevention of cold spots and dead volumes that otherwise could degrade performance of a chromatography system.

Referring now to FIG. 2C, a partial cross-section of the chromatography device 200 is shown that illustrates various features of the chromatography device 200. For example, as shown in FIG. 2C, the first chromatography column 204 comprises a first channel 221 formed as a first trench in the substrate 202. Within the first channel 221, the first chromatography column 204 comprises a first stationary phase 222 comprising a material that absorbs and desorbs various chemical species in an analyte sample at different rates. The first stationary phase 222 is deposited on sidewalls 224 of the channel 221 such that a fluid flowing through the first channel 221 is exposed to the first stationary phase 222. Similarly, the second chromatography column 206 comprises a second channel 226 that is formed as a second trench in the substrate 202. Within the second channel 226, the second chromatography column 206 comprises a second stationary phase 228 that absorbs and desorbs various chemical species in an analyte sample at different rates than the first stationary phase 222. The second stationary phase 228 is deposited on sidewalls 230 of the second channel 226, such that a fluid flowing through the second channel 226 is exposed to the second stationary phase 228.

As shown in FIG. 2C, the chromatography device 200 includes the heating element 218 on the backside 220 of the substrate 202. The chromatography device further includes a cap 232 on a front side 234 of the substrate 202. The cap 232 forms a final sidewall of each of the channels 221, 226. In various embodiments, the stationary phases 222, 228 can extend along the cap 232 within the channels 221, 226.

It is to be understood that while the chromatography column stack 100 and the chromatography device 200 are each shown as including two chromatography columns, a monolithically integrated chromatography device can include substantially any number of chromatography columns. In a non-limiting exemplary embodiment, and referring again to FIG. 2A, the outlet port 212 can be replaced by a second transfer port that serves as an inlet to a third chromatography column formed on the substrate 202. In such embodiments, the third chromatography column can include an output port that is coupled to the output channel 216 and thusly to the detector 214. Thus, it is to be appreciated that substantially any number of chromatography columns can be formed on the substrate 202 and connected in series, such that a fluid analyte sample passes through each of the chromatography columns in turn.

Figure 3:
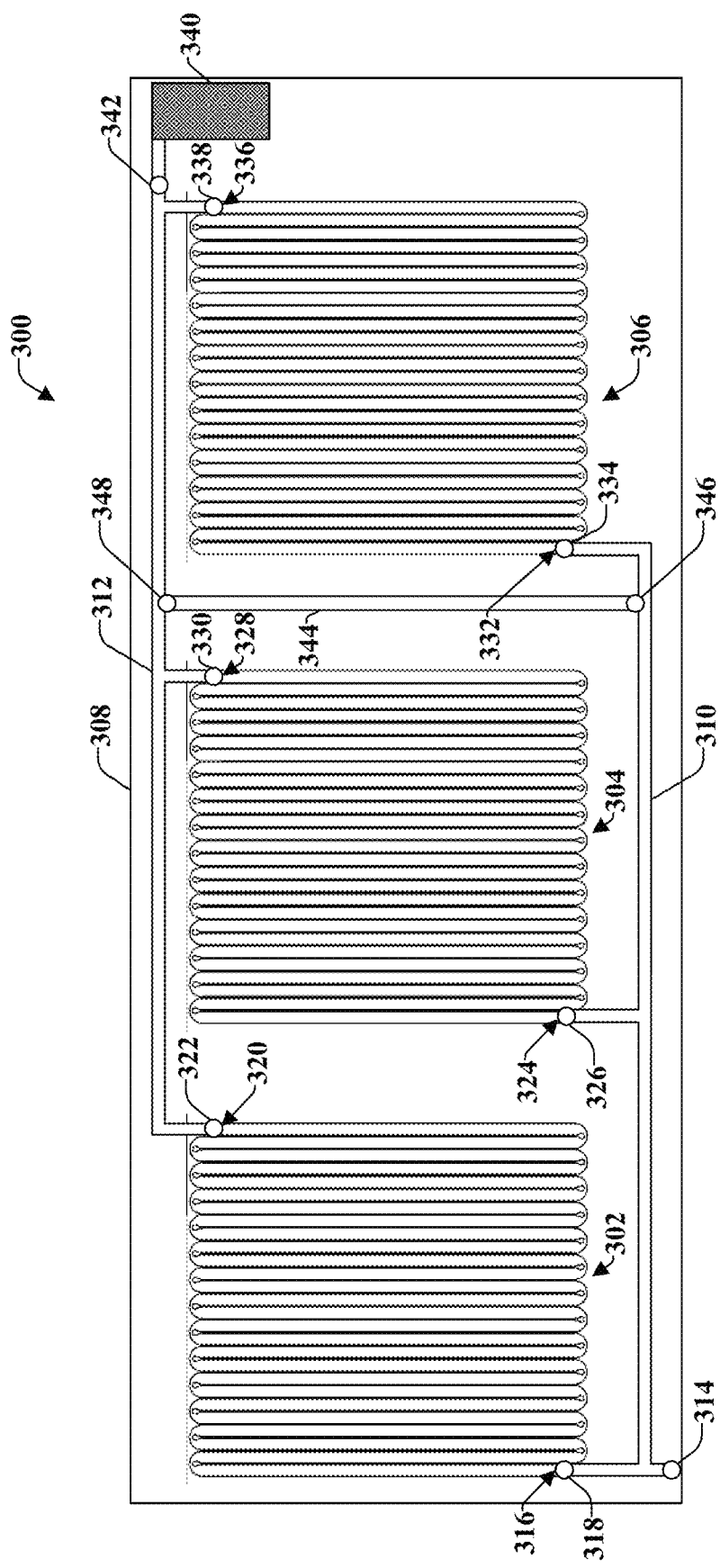
FIG. 3 is a top-down view of another exemplary chromatography system that includes an array of chromatography columns.

In other embodiments, a plurality of chromatography columns can be formed on a substrate such that an order through which a fluid analyte sample passes through the chromatography columns is controllable. Referring now to FIG. 3, a top-down view of another exemplary chromatography device 300 is shown. The chromatography device 300 comprises a plurality of chromatography columns 302-306 formed on a common substrate 308. In the exemplary chromatography device 300 shown in FIG. 3, a plurality of three chromatography columns 302-306 is illustrated. However, it is to be understood that a chromatography device constructed in accordance with the description of FIG. 3 can include substantially any number of chromatography columns. The chromatography device 300 further includes an inlet channel 310 and an outlet channel 312. The inlet channel 310 further comprises a sample inlet port 314 that is configured to receive an analyte sample that is desirably separated by the chromatography device 300. The chromatography columns 302-306 are each fluidically coupled to the inlet channel 310 and the outlet channel 312 by way of a respective pair of transfer ports.

The first chromatography column 302 has an inlet 316 that is coupled to the inlet channel 310 by way of a first inlet transfer port 318. The first chromatography column 302 further has an outlet 320 that is coupled to the outlet channel 312 by way of a first outlet transfer port 322. Similarly, the second chromatography column 304 has an inlet 324 that is coupled to the inlet channel 310 by way of a second inlet transfer port 326, and an outlet 328 that is coupled to the outlet channel 312 by way of a second outlet transfer port 330. Further, the third chromatography column 306 has an inlet 332 that is coupled to the inlet channel 310 by way of a third inlet transfer port 334, and an outlet 336 that is coupled to the outlet channel 312 by way of a third outlet transfer port 338. The inlet transfer ports 318, 326, 334 and the outlet transfer ports 322, 330, 338 can be selectively opened or closed by way of flow control elements (not shown) that may be either integrated with the ports 318, 322, 326, 330, 334, 338, or externally coupled to the ports 318, 322, 326, 330, 334, 338.

An analyte sample is provided to the chromatography device 300 by way of the sample inlet port 314. The analyte sample flows into the inlet channel 310, and is directed by the inlet channel 310 to one of the chromatography columns 302-306. Which of the chromatography columns 302-306 receives the analyte sample from the inlet channel 310 can be controlled by way of the inlet transfer ports 318, 326, 334.

For example, the analyte sample can be directed to the first chromatography column 302 by opening the first inlet transfer port 318 and closing the second inlet transfer port 326 and the third inlet transfer port 334. Continuing the example, the analyte sample can be released from the first chromatography column 302 and into the outlet channel 312 by opening the first outlet transfer port 322. The second and third outlet transfer ports 330, 338 can be kept closed while the sample is released from the first chromatography column 302 to the outlet channel 312 to prevent back-feeding of the sample into the second and third chromatography columns 304, 306.

When an analyte sample is released into the outlet channel 312, the analyte sample can be directed to a detector. The chromatography device 300 includes a detector 340 that is coupled to the outlet channel 312 by way of a sample outlet port 342. The sample outlet port 342 can be selectively opened and closed by way of a flow control element (e.g., a valve, Deans switch, or the like). When the sample outlet port 342 is opened, a sample present in the outlet channel 312 is released onto the detector 340, whereupon the detector 340 outputs a signal that is indicative of mass of the sample released onto the detector 340 over time.

Rather than being directed immediately to the detector 340, the analyte sample in the outlet channel 312 can instead be directed back through one or more of the chromatography columns 302-306 for further separation. The chromatography device 300 further comprises a transfer channel 344 that is coupled to the inlet channel 310 and the outlet channel 312 by way of transfer ports 346, 348. The inlet channel 310 is coupled to the transfer channel 344 by way of the first transfer port 346. The outlet channel 312 is coupled to the transfer channel 344 by way of the second transfer port 348. When both of the transfer ports 346, 348 are open, the inlet channel 310 and the outlet channel 312 are in fluidic communication by way of the transfer channel 344. Thus, when both of the transfer ports 346, 348 are open, an analyte sample can flow from the outlet channel 312 to the inlet channel 310. The transfer ports 346, 348 can further be operated in an airlock fashion, whereby only one of the transfer ports 346, 348 is open at a time. For example, the second transfer port 348 that is coupled to the outlet channel 312 can be opened to allow an analyte sample to flow from the outlet channel 312 to the transfer channel 344. The second transfer port 348 can then be closed to contain the analyte sample within the transfer channel 344. To transfer the analyte sample to the inlet channel 310, the first transfer port 346 can then be opened. When the first transfer port 346 is opened, the inlet transfer ports 318, 326, 334 leading to the chromatography columns 302-306 can be kept closed to facilitate transfer of the sample from the transfer channel 344 to the inlet channel 310.

After the analyte sample is returned from the outlet channel 312 back to the inlet channel 310 by way of the transfer channel 344, the sample can be further separated by another of the chromatography columns 302-306. Continuing the example from above, the analyte sample that has been separated by the first chromatography column 302 can be transferred from the outlet channel 312 back to the inlet channel 310 by way of the transfer channel 344. The separated sample can then be provided to the second chromatography column 304 by opening the inlet transfer port 326 of the second chromatography column 304. The outlet transfer port 330 of the second chromatography column 304 can then be opened to allow the twice-separated sample to flow into the outlet channel 312. From there, the twice-separated sample can be again transferred back to the inlet channel 310, or can be provided to the detector 340.

Accordingly, it is to be appreciated that an analyte sample can be directed through a sequence of the chromatography columns 302-306 in any order. Furthermore, an analyte sample can be directed through only some subset of the chromatography columns 302-306 prior to being provided to the detector 340. By way of example, an analyte sample can be directed through the first chromatography column 302, then through the third chromatography column 306, and then to the detector 340, without the analyte sample passing through the second chromatography column 304. The chromatography device 300 is therefore suited to performing different chromatographic analyses on-demand, without reconfiguring the construction or underlying fluidic components of the device 300. In various embodiments, the chromatography device 300 can further include a heating element formed on a backside of the chromatography device 300 (not shown), in similar fashion to the heating element 218 of the chromatography device 200.

Figure 4:
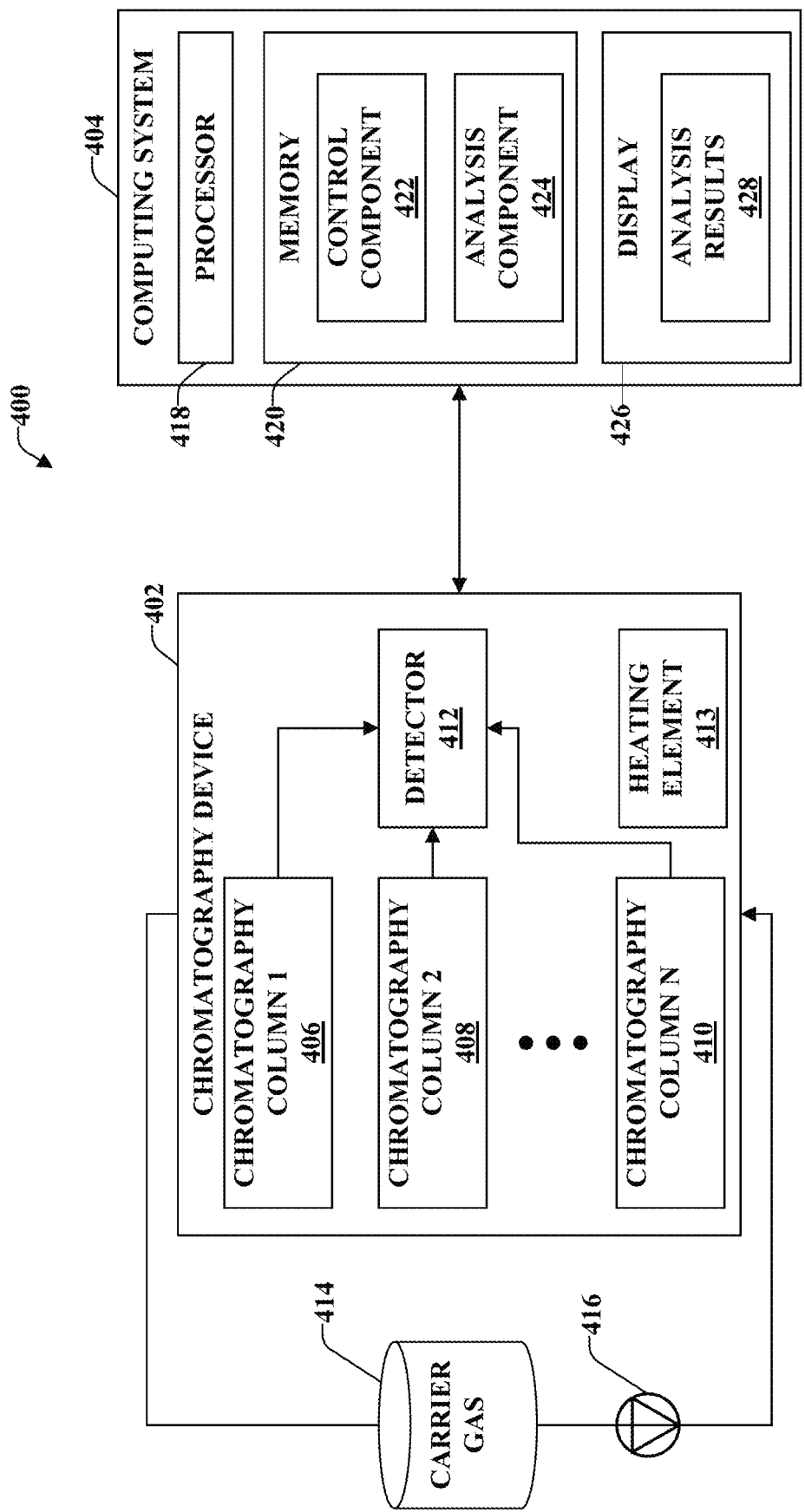
FIG. 4 is a functional block diagram of still another exemplary chromatography system.

Referring now to FIG. 4, a functional block diagram of an exemplary chromatography system 400 is shown. The chromatography system 400 includes a chromatography device 402 and a computing system 404. The chromatography device includes a plurality of N chromatography columns 406-410, where N is a non-zero positive integer, a detector 412, and a heating element 413. The chromatography columns 406-410 can be fluidically coupled to one another by way of channels and ports that can be selectively opened and closed by controllable flow control elements. For the purpose of clarity, these various channels, ports, and flow control elements are omitted from FIG. 4. The chromatography columns 406-410 and channels and ports connecting them can be monolithically integrated on a same substrate chip (e.g., a silicon chip). Further, the detector 412 can be disposed on the same chip as the chromatography columns 406-410. The chromatography columns 406-410 can further be fluidically coupled to the detector 412, such that the detector 412 can receive a separated analyte sample from any of the chromatography columns 406-410. In an exemplary embodiment, the chromatography columns 406-410 are arranged in an array wherein each of the columns 406-410 is separately addressable (e.g., as depicted in the chromatography device 300 of FIG. 3). Stated differently, the chromatography device 402 can be configured such that each of the columns 406-410 can initially receive an analyte sample from a test environment, each of the columns 406-410 can receive a separated sample from any of the other columns 406-410, and each of the columns 406-410 can output a separated sample to the detector 412.

The heating element 413 can be disposed on a same chip as the chromatography columns 406-410. The heating element 413 is configured to heat at least one of the chromatography columns 406-410 to facilitate absorption/desorption of an analyte sample by the chromatography columns 406-410 and to prevent cold spots in the chromatography device 402 that might cause condensation of the analyte sample.

In some embodiments, the system 400 can include a carrier gas reservoir 414 and a pump 416. The carrier gas reservoir 414 can store a carrier gas that does not readily interact with stationary phases of the chromatography columns 406-410 or chemical species expected to be present in the analyte sample (e.g., hydrogen, a noble gas, or the like). The pump 416 pumps a carrier gas into the chromatography device 402 to maintain a fluid pressure within the chromatography columns 406-410 and the various channels connecting them. Migration of an analyte sample through the columns 406-410 and channels can be controlled by controlling the pump 416 and one or more flow control elements of the chromatography device 402. In various embodiments, the pump 416 can be configured to pump carrier gas from the carrier gas reservoir 414 into the chromatography device 402. In other embodiments, the pump 416 can be configured to pump ambient air into the chromatography device 402 as a carrier gas. In these embodiments, the carrier gas reservoir 414 can be omitted.

The computing system 404 includes a processor 418 and memory 420 that stores instructions that are executed by the processor 418. The memory 420 comprises a control component 422 and an analysis component 424. The control component 422, when executed by the processor 418, causes the computing system 404 to control operation of various components of the system 400. By way of example, and not limitation, the control component 422 can control operation of the pump 416 to maintain a desired fluid pressure within the chromatography device 402. In other non-limiting examples, the control component 422 can electrically control operation of various flow control elements of the chromatography device 402 to regulate flow of an analyte sample through the chromatography device 402.

The analysis component 424 is configured to receive data output by the detector 412 and to output, based upon the data, an indication of a property of a separated analyte sample that impinges on the detector 412. For example, in embodiments wherein the detector 412 comprises a PPR detector, the detector 412 can output data indicative of an oscillation frequency of a pivot plate included on the detector 412 over a period of time. The analysis component 424 receives the data indicating the oscillation frequency over the period of time, and can compute a mass of the detector 412 over time. The mass of the detector 412 over time can be indicative of a separation of an analyte sample by the chromatography columns 406-410. In some embodiments, the analysis component 424 can further be configured to compute an indication of a property of a separated analyte sample based upon operation of the system 400 as controlled by the control component 422. For example, the control component 422 can be configured to employ stop-flow modulation in connection with performing multi-dimensional gas chromatography. In such examples, the analysis component 424 can identify, based upon the data output by the detector and a stop-flow modulation employed by the control component 422, separation of an analyte sample by each of multiple chromatography columns in the columns 406-410 separately. In various embodiments, the computing system 404 can further include a display 426. In these embodiments, the analysis component 424 can output analysis results 428 to the display 426 for review by an analyst operator of the system 400.

Figure 5:
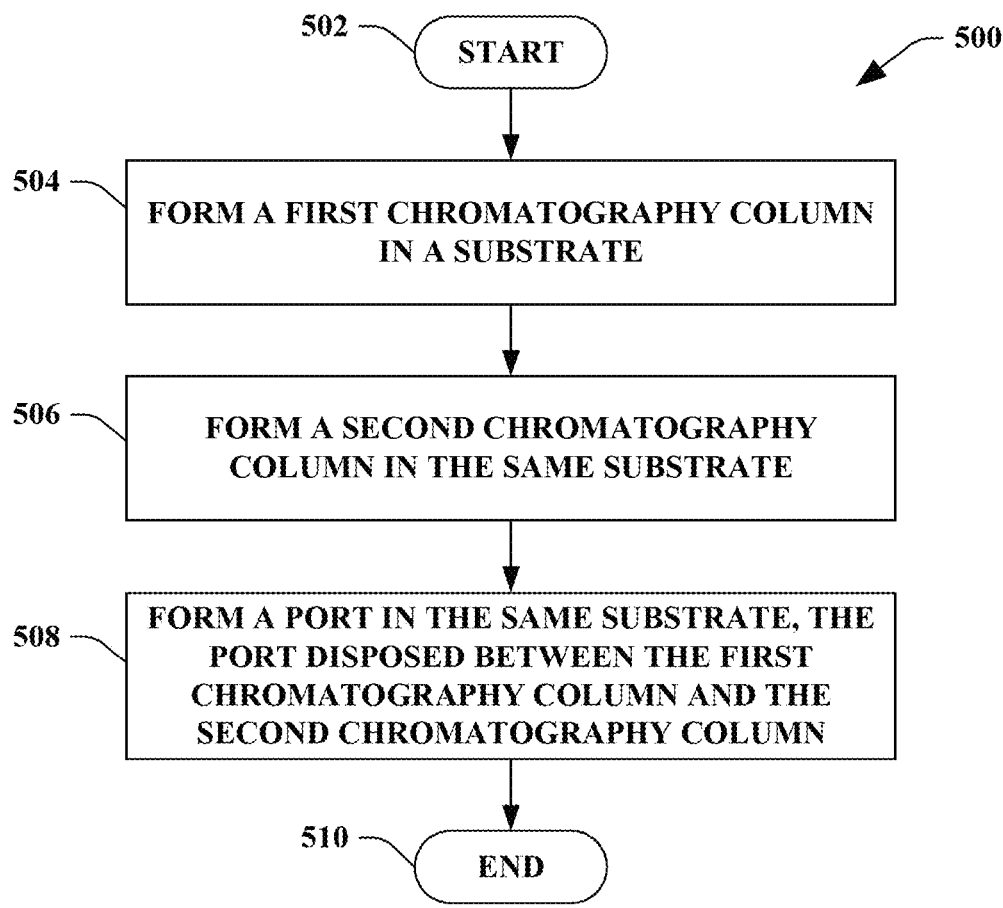
FIG. 5 is a flow diagram that illustrates an exemplary methodology for fabricating a chromatography system.
Figure 6:
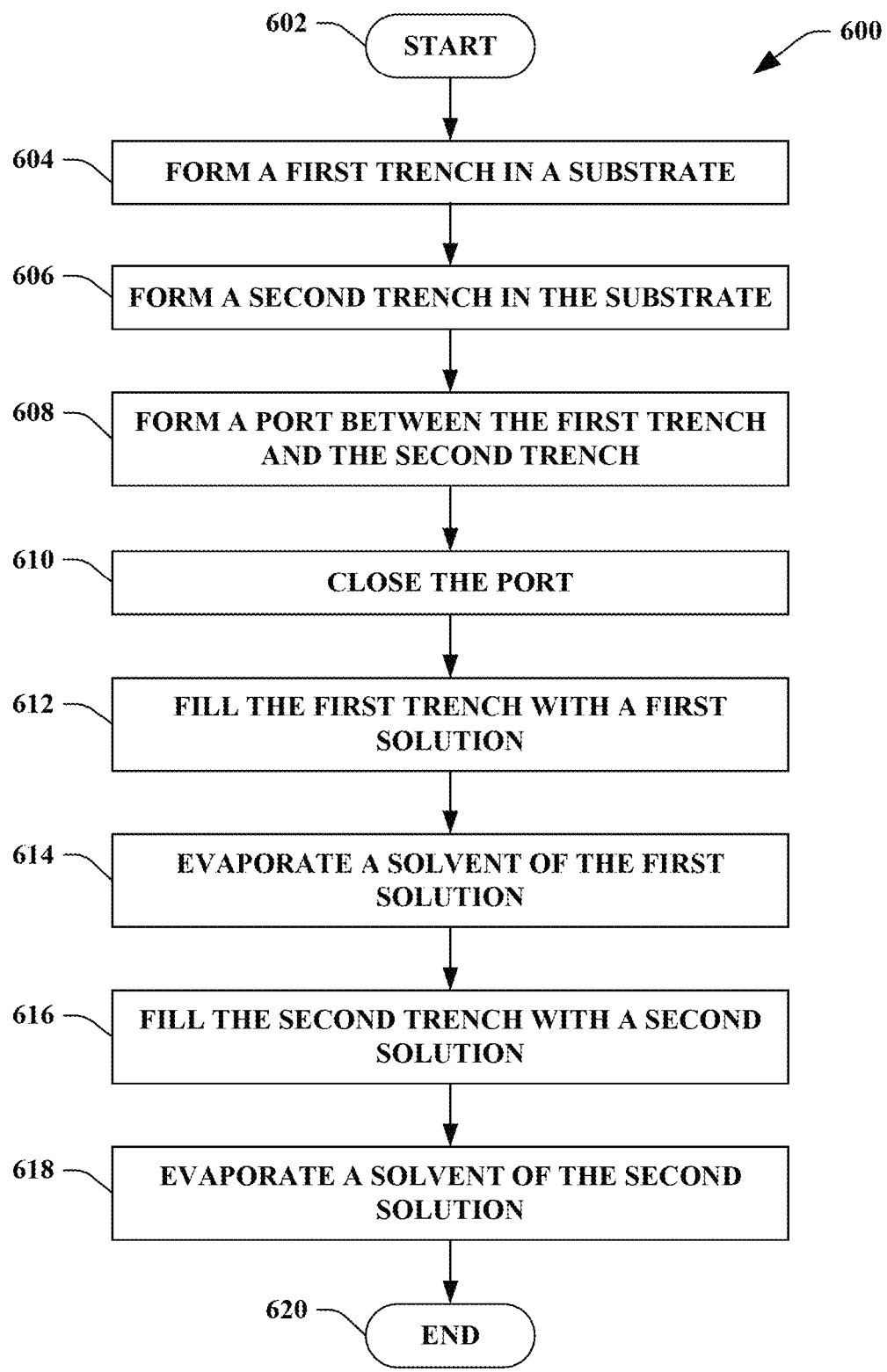
FIG. 6 is a flow diagram that illustrates an exemplary methodology for forming chromatography columns on a common substrate.
Figure 7:
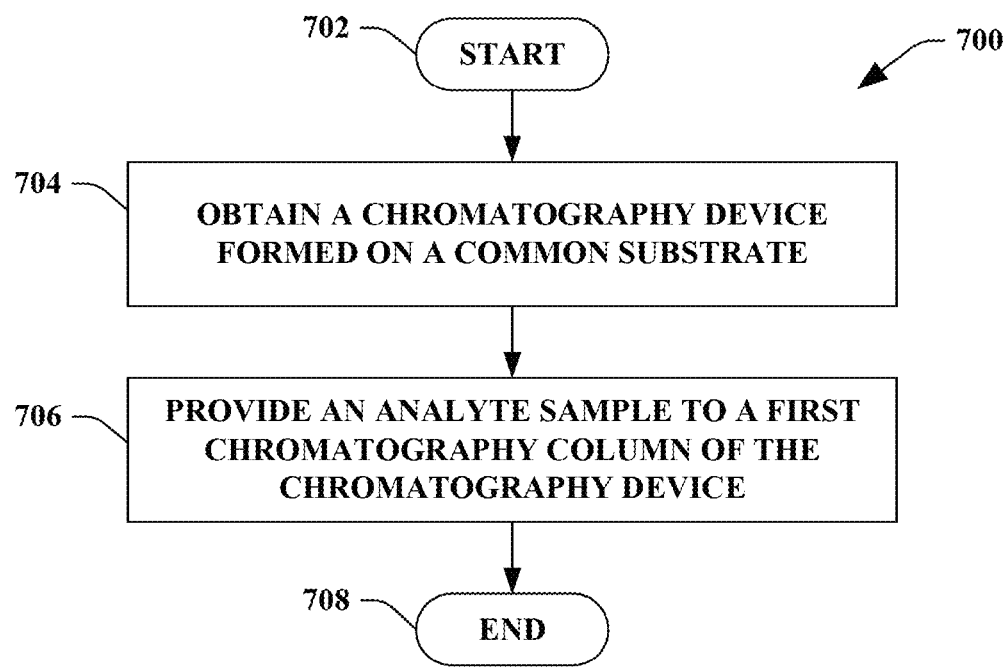
FIG. 7 is a flow diagram that illustrates an exemplary methodology for using a chromatography system.

FIGS. 5-7 illustrate exemplary methodologies relating to making and using a chromatography system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, a methodology 500 that facilitates manufacture of a chromatography device is illustrated. The methodology 500 begins at 502, and at 504, a first chromatography column is formed in a substrate. At 506, a second chromatography column is formed in the same substrate as the first chromatography column. At 508, a port is formed in the same substrate as the first and second chromatography columns such that the port is disposed between the first and second chromatography columns. The port is formed such that, when the port is open, the first and second chromatography columns are in fluidic communication with one another, and that when the port is closed, the first and second chromatography columns are not in fluidic communication with one another. The first chromatography column, the second chromatography column, and the port can all be formed such that they are monolithically integrated into the same substrate. For example, the first chromatography column and the second chromatography columns can be formed as respective first and second trenches in the substrate. The trenches and/or the port can be formed by any of various monolithic substrate processing techniques such as etching, ablation, or the like. The methodology 500 completes at 510.

Referring now to FIG. 6, a methodology 600 that facilitates forming a plurality of chromatography columns on a common substrate is illustrated. The methodology 600 begins at 602, and at 604, a first trench is formed in a substrate. The first trench forms the sidewalls of a first chromatography column. At 606, a second trench is formed in the same substrate as the first trench. The second trench forms the sidewalls of a second chromatography column. At 608, a port is formed in the substrate between the first trench and the second trench such that the first trench and the second trench are in fluidic communication by way of the port. It is to be understood that while forming the first trench 604, forming the second trench 606, and forming the port 608 are illustrated as distinct steps, the trenches and the port can be formed substantially simultaneously as part of a substrate etching process. For example, the substrate can be exposed to an etchant solution that simultaneously etches away material of the substrate at locations of the first trench, the second trench, and the port in the substrate.

At 610, the port is closed so that the first trench and the second trench are not in fluidic communication. In some embodiments, the port can be closed 610 after a cap has been affixed to the substrate, wherein the cap encloses the first trench and the second trench. At 612, the first trench is filled with a first solution. The first solution is a solution that comprises a first stationary phase material that is desirably deposited on sidewalls of the first trench, dissolved into a solvent. The first trench can be filled with the first solution by way of an inlet to the first trench. For example, and referring briefly once again to FIGS. 2A-2C, the first solution can be provided to the first channel 221 by way of the inlet 208. In another example, and referring now to FIG. 3, the first solution can be provided to a channel that forms the first chromatography column 302 by way of the inlet port 314 and the first inlet transfer port 318 by additionally keeping closed ports 326, 334, 346. At 614, the solvent of the first solution is evaporated to deposit the first stationary phase material on the sidewalls of the first trench.

At 616, the second trench is filled with a second solution. The second solution comprises a second stationary phase material that is desirably deposited on sidewalls of the second trench, dissolved into a solvent. The second trench can be filled with the second solution by way of an inlet to the second trench. For example, and referring again to FIGS. 2A-2C, the second solution can be provided to the second channel 226 by way of the outlet port 212. By way of another example, and referring now to FIG. 3, the second solution can be provided to the second chromatography column 304 by way of the inlet port 314 and the inlet transfer port 326 by keeping ports 318, 346, and 334 closed. At 618, a solvent of the second solution is evaporated to deposit the second stationary phase material on the sidewalls of the second trench. It is to be appreciated that the operations of filling a trench with a solution (e.g., 612, 616) and evaporating a solvent of the solution (e.g., 614, 618) can be performed with respect to each of a plurality of trenches formed in a substrate for constructing a chromatography device. The methodology 600 ends at 620.

Referring now to FIG. 7, an exemplary methodology 700 for using a monolithically integrated chromatography device is illustrated. The methodology 700 begins at 702, and at 704, a chromatography device that is formed on a common substrate is obtained. The chromatography device can include a first chromatography column, a second chromatography column, and a port that couples the first chromatography column and the second chromatography column so that they are in fluidic communication with one another. In various embodiments, the port can be selectively opened and closed by way of a valve or other flow control element. In these embodiments, the first and second chromatography columns are in fluidic communication when the port is open and not in fluidic communication when the port is closed. At 706, an analyte sample is provided to a first chromatography column of the chromatography device. The analyte sample traverses the first chromatography column, and various chemical species included in the sample are separated due to differential absorption/desorption by a stationary phase of the first chromatography column. The separated analyte sample then passes to the second chromatography column by way of the port, whereupon the separated sample is further separated due to differential absorption/desorption of chemical species by a stationary phase of the second chromatography column. The methodology 700 completes at 708.

Figure 8:
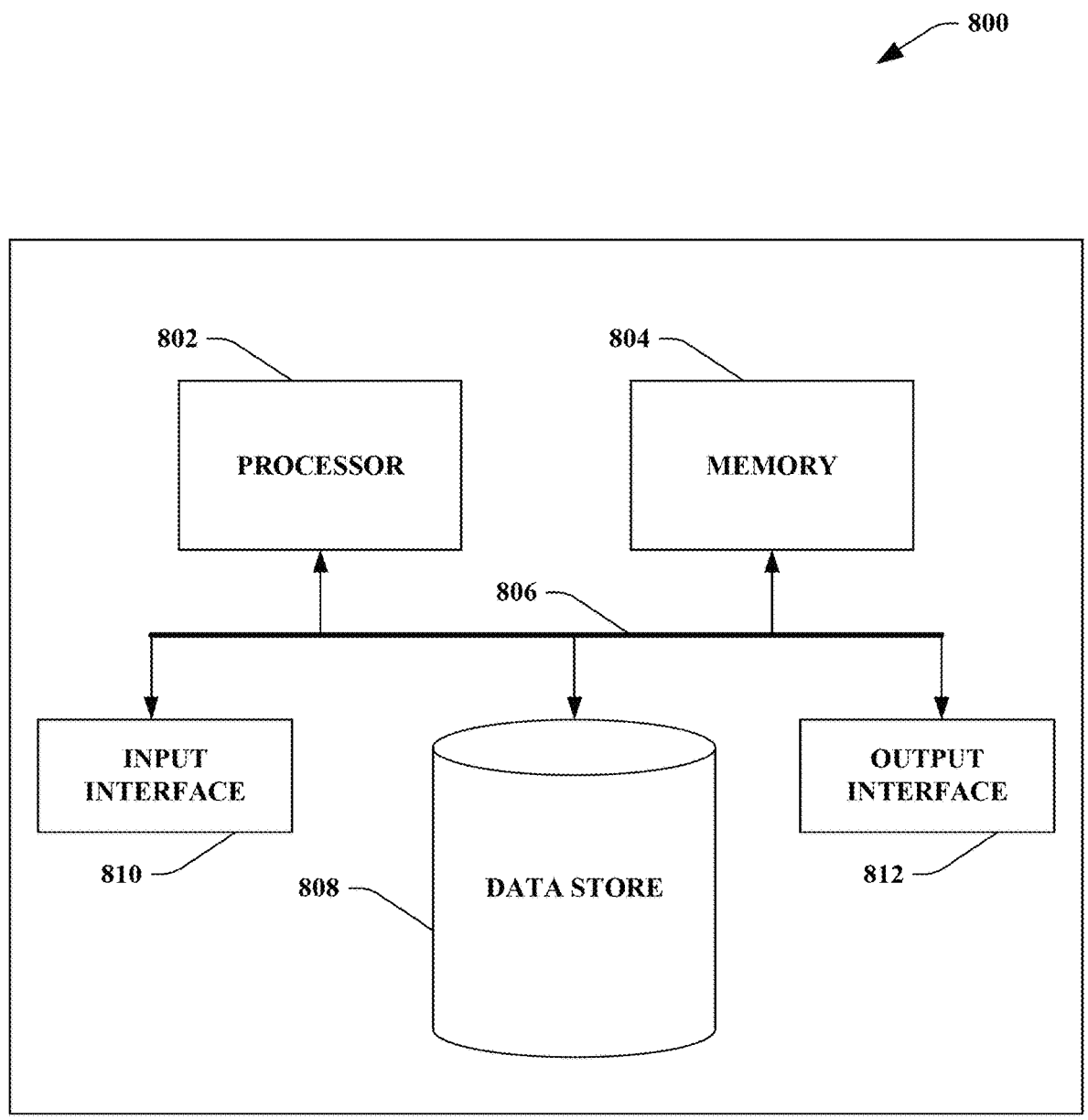
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system for controlling operation of a chromatography device. In another example, the computing device 800 may be used in a system for analyzing data output by a detector of a chromatography device. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store control parameters for a chromatography system, chromatography data output by a detector of a chromatography device, etc.

The computing device 800 additionally includes a data store 808 that is accessible by the processor 802 by way of the system bus 806. The data store 808 may include executable instructions, control parameters for a chromatography system, chromatography data output by a detector of a chromatography device, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc., by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for chromatography, comprising:
   a first chromatography column formed in a substrate;
   a second chromatography column formed in the substrate;
   a port formed in the substrate between the first chromatography column and the second chromatography column, wherein the first chromatography column terminates in the port and the port serves as an inlet to the second chromatography column; and
   a flow control element coupled to the port and configured to open and close the port, wherein when the port is open the first chromatography column is in fluidic communication with the second chromatography column, and when the port is closed the first chromatography column and the second chromatography column are not in fluidic communication.

2. The system of claim 1, wherein the first chromatography column comprises:
   a trench formed in the substrate, the trench having a sidewall; and
   a coating formed on the sidewall of the trench, the coating configured such that a first chemical species and a second chemical species that are present in a fluid flowing through the first chromatography column are absorbed by the coating at different rates.

3. The system of claim 1, wherein the flow control element is formed in the substrate as a micro-electromechanical system (MEMS) device.

4. The system of claim 1, wherein the flow control element is non-monolithically coupled to the port.

5. The system of claim 1, further comprising:
   an inlet port formed in the substrate in fluidic communication with the first chromatography column, the inlet port configured to receive an analyte sample;
   an outlet port formed in the substrate in fluidic communication with the second chromatography column.

6. The system of claim 5, further comprising a detector formed on the substrate, wherein the outlet port is configured to convey, to the detector, a fluid flowing in the second chromatography column.

7. The system of claim 1, wherein the first chromatography column has a switch-back configuration.

8. The system of claim 1, wherein the first chromatography column has a spiral configuration.

9. The system of claim 1, further comprising a cap that is attached to the substrate such that the cap forms a wall of each of the first chromatography column and the second chromatography column.

10. The system of claim 9, wherein the cap comprises a glass slide.

11. The system of claim 10, wherein the glass slide is anodically bonded to the substrate.

12. The system of claim 9, wherein the cap is bonded to the substrate by way of a eutectic bond.

13. The system of claim 1, further comprising a heating element formed on or attached to the substrate.

14. The system of claim 13, wherein the first chromatography column and the second chromatography column are formed in a first side of the substrate, wherein further the heating element is disposed on a second side of the substrate opposite the first side.

15. The system of claim 13, wherein the heating element comprises an electrically conductive trace.

16. The system of claim 1, wherein the flow control element is a valve modulated by pressure.

17. The system of claim 1, wherein the first chromatography column, the second chromatography column, and the port are monolithically integrated in the substrate.

18. A method, comprising:
   obtaining a chromatography device formed on a substrate chip, the chromatography device comprising:
      a first chromatography column;
      a second chromatography column; and
      a port, the first chromatography column and the second chromatography column in fluidic communication by way of the port, wherein the first chromatography column terminates in the port and the port serves as an inlet to the second chromatography column; and
   providing an analyte sample to the first chromatography column, wherein the analyte sample traverses the first chromatography column and the second chromatography column, whereupon the analyte sample is separated by the first chromatography column to yield a separated analyte sample, and whereupon the separated analyte sample is separated by the second chromatography column to yield a further-separated analyte sample.

19. The method of claim 18, wherein the port can be selectively opened or closed by way of a flow control element, wherein when the port is opened the first chromatography column and the second chromatography column are in fluidic communication by way of the port, and wherein when the port is closed the first chromatography column and the second chromatography column are not in fluidic communication, the method further comprising opening the port by way of the flow control element to allow the analyte sample to migrate from the first chromatography column to the second chromatography column.

20. A chromatography system comprising:
   a chromatography column stack, the chromatography column stack comprising:
      a first chromatography column formed in a substrate;
      a second chromatography column formed in the substrate;
      a port formed in the substrate such that the first chromatography column and the second chromatography column are in fluidic communication by way of the port, wherein the first chromatography column terminates in the port and the port serves as an inlet to the second chromatography column;
a heating element formed on the substrate such that the heating element heats at least one of the first chromatography column or the second chromatography column; and
a detector formed on the substrate, the detector configured to receive an analyte sample from one of the first chromatography column or the second chromatography column and to output data indicative of a separation of the analyte sample.

* * * * *